June 8, 1926.

J. T. BUCKINGHAM 1,587,819

RESILIENT WHEEL

Filed Jan. 2, 1925

Inventor
John T. Buckingham,
By
Atty

Patented June 8, 1926.

1,587,819

UNITED STATES PATENT OFFICE.

JOHN THOMAS BUCKINGHAM, OF MILDURA, VICTORIA, AUSTRALIA, ASSIGNOR TO BUCKINGHAM FLOATING HUB COMPANY PROPRIETARY LIMITED, OF MILDURA, AUSTRALIA.

RESILIENT WHEEL.

Application filed January 2, 1925, Serial No. 235, and in Australia January 18, 1924.

This invention refers to resilient wheels of the disc type employed to minimize road shocks and permit the practical use of solid rubber tyres.

Many improvements have heretofore been tried or proposed but through constructional difficulties, excessive cost of manufacture, inaccessibility of parts likely to require replacement owing to wear or breakage and inefficiency, such resilient wheels are not in general use.

The objects of these improvements are to provide more satisfactory and reliable resilient means that are strong and readily accessible and moderate in cost of manufacture.

Figure 1:
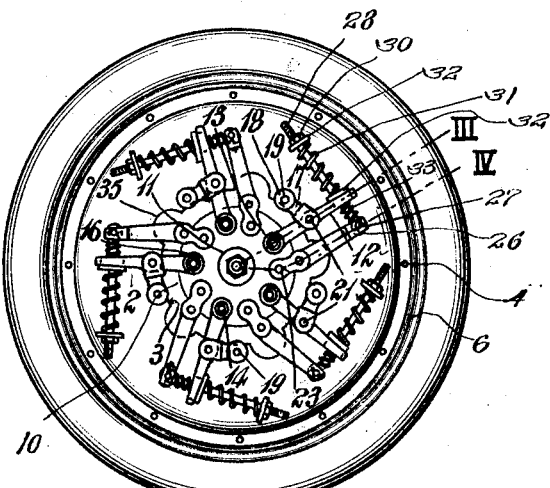
Figure 3:
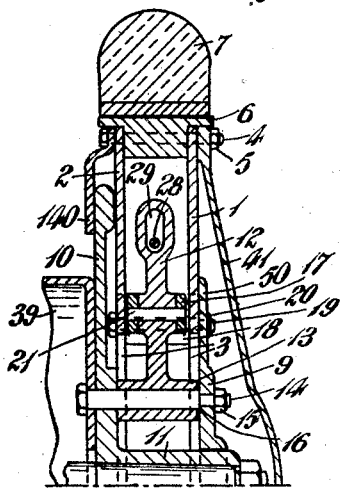
Figure 4:
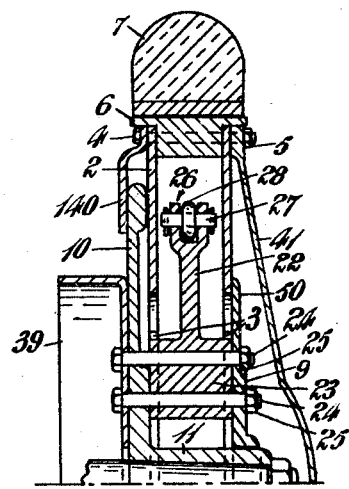
Figure 2:
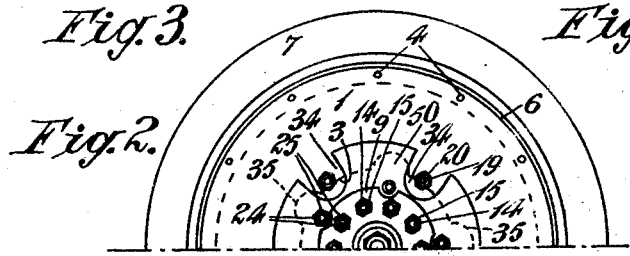

A practical form of the invention is illustrated in the accompanying drawings of which, Figure 1 is a side elevation of a back wheel with the outer cover, the outer disc and thrust plate removed, and Figure 2 a half side elevation with the outer cover removed, Figure 3 is an enlarged section through the wheel on line III of Figure 1, and Figure 4 an enlarged section on line IV of Figure 1.

According to the form illustrated the separated outer disc 1 and the inner disc 2 are each formed with a central opening 3 and are connected at their peripheral edges by bolts 4, passed through the rim 6 to which the solid rubber tyre 7 is fixed.

The inner disc 2 may be welded to the rim 6, but the outer disc 1 is readily removable by unscrewing nuts 5 of the bolts 4 for examination of the interior of the wheel.

On the hub 11 outside the discs 1, 2 are thrust plates 9, 10, the plate 9 having a central aperture to fit over the hub while the plate 10 is formed integral with the latter. The plates overlap the edges of the openings 3 and insure a true running of the wheels in relation to the axle, though the outer plate 9 need not necessarily overlap the disc 1 and may be smaller in diameter by omitting the portion 50. In addition a thrust plate 140 is secured by bolts 4 and overlaps the outer edge of plate 10.

Between the discs are located a series of circumferentially arranged equi-spaced spring cushion devices each comprising a radially disposed lever 12 formed at its inner end with a boss 13 bored to receive a pivot bolt 14 passed through holes bored in the thrust plates 9, 10, and if desired through the brake drum 39 and secured by nuts 15 said bolts being formed with a shoulder 16 bearing against the outer thrust plate 9.

Between the boss 13 and the outer end of the lever a link 17 is pivotally connected to said lever and formed with a boss 18 bored to receive a pivot bolt 19 passed through holes in the discs and secured by a nut 20. Said link extends tangentially and is bifurcated as illustrated at one end to embrace the lever 12 being pivotally connected thereto by a pin 21.

Adjacent and approximately parallel to said lever is an arm 22 formed at its inner end with a boss 23 bearing at its ends against the thrust plates 9, 10 and bored to receive bolts 24 passed through said plates and preferably also the brake drum 39, if adjacent, said bolts having nuts 25.

The arm 22 has a bifurcated end 26 to which by means of a pin 27 is pivoted a rod 28 that extends in a tangential direction through a slot 29 formed in the outer end of lever 12 and is screw threaded at its free end to receive a nut 30. Between the nut and the lever a spring 31 is wrapped on the rod 28 and bears against washers 32 at each end and its compression is adjusted by said nut. This spring mainly absorbs road shocks and in addition a smaller recoil spring 33 wrapped on the rod 28 between the lever 12 and the arm 22 acts as a buffer to the lever 12 and absorbs shock thereto on its return movement to normal position.

It will be understood that when the wheel suddenly dips into a depression in or rises over an obstruction upon the road surface the levers and arms of the cushion devices relatively separate farther apart by the relative movement between the discs and the plates thus compressing the springs 31 between the levers 12 and nuts 30 and absorbing the shock and as said lever and arm 22 again approach each other the resilient element such as spring 33 acts as a buffer and assists in the cushioning effect.

When the plate 9 overlaps disc 1, its peripheral edge is formed with scollops 34 (Fig. 2) to accommodate the nuts 20 and likewise the edges of the central openings 3 of the discs may be formed with scollops 35 to accommodate the bosses 23 of the arms 22 thus affording freedom of movement in regard to the plates and discs.

The thrust plate 9 is retained in position by the bosses 23, the through bolts 14 and 24 and shoulders 16 of said bolts 14 and the thrust plate 10 is preferably cast integral with the hub.

The outer thrust plate 9 and disc are concealed by a cover plate 41 secured for instance by bolts 4.

I claim:—

1. In resilient wheels, a pair of thrust plates on the wheel hub, a pair of centrally apertured discs located between said plates and secured to the tyre rim, a series of circumferentially arranged cushion devices between said discs each comprising a radially disposed lever pivoted to said plates, a link pivoted to said discs and connected to said lever, an arm fixed to said plates, a tangentially disposed rod pivoted to the outer end of said arm and extending through a slot formed in the outer end of said lever, and a spring on said rod between said lever and a nut provided on the free end of said rod.

2. In resilient wheels, a pair of thrust plates on the wheel hub, a pair of centrally apertured discs located between said plates and secured to the tyre rim, a series of circumferentially arranged cushion devices between said discs each comprising a radially disposed lever pivoted to said plates, a link pivoted to said discs and connected to said lever, an arm fixed to said plates, a tangentially disposed rod pivoted to the outer end of said arm and extending through a slot formed in the outer end of said lever, a spring on said rod between said lever and a nut provided on the free end of said rod and a resilient buffer between said lever and arm.

3. In resilient wheels, a pair of thrust plates on the wheel hub, a pair of discs formed with central apertures located between said plates and secured to the tyre rim, a series of circumferentially arranged cushion devices between said discs each comprising a radially disposed lever formed at the inner end with a boss pivoted on a shouldered bolt secured to the plates and formed at the outer end with a slot, an arm approximately parallel to said lever formed at the inner end with a boss bearing against and fixed to the plates by bolts, a rod pivoted to the outer end of said arm and extending in a tangential direction through the slot in the lever, a spring on said rod between the lever and a nut on the free end of said rod, and a resilient buffer on said rod between the lever and arm.

4. In resilient wheels, a pair of thrust plates on the wheel hub, a pair of discs formed with central apertures located between said plates and secured to the tyre rim, a series of circumferentially arranged cushion devices between said discs each comprising a radially disposed lever formed at the inner end with a boss pivoted on a shouldered bolt secured to the plates and formed at the outer end with a slot, an arm approximately parallel to said lever formed at the inner end with a boss bearing against and fixed to the plates by bolts, a rod pivoted to the outer end of said arm and extending in a tangential direction through the slot in the lever, a spring on said rod between the lever and a nut on the free end of said rod, a resilient buffer on said rod between the lever and arm, said discs having the edges of their central apertures formed with scollops.

Dated this eighth day of September, 1924.

JOHN THOMAS BUCKINGHAM.